(12) United States Patent
Pucher et al.

(10) Patent No.: US 7,525,113 B2
(45) Date of Patent: Apr. 28, 2009

(54) OPTICAL SCANNING UNIT AND METHOD FOR MOUNTING THE SAME

(75) Inventors: Wolfgang Pucher, Bergen (DE); Robert Sturm, Altenmarkt (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/588,815

(22) Filed: Oct. 27, 2006

(65) Prior Publication Data

US 2007/0102631 A1  May 10, 2007

(30) Foreign Application Priority Data

Nov. 9, 2005  (DE) ................... 10 2005 053 787

(51) Int. Cl.
*G01N 21/86* (2006.01)
*G01D 5/34* (2006.01)
*G01B 11/14* (2006.01)
*H03K 17/94* (2006.01)

(52) U.S. Cl. ............ 250/559.29; 250/231.13; 356/615; 341/31

(58) Field of Classification Search ................ 250/231.13–231.16, 559.29, 559.26, 559.19; 33/1 PT, 1 N; 341/11, 13, 31; 356/616, 356/617, 615
See application file for complete search history.

(56) References Cited

U.S. PATENT DOCUMENTS

| 3,963,926 | A | * | 6/1976 | Borrello | ............ 250/338.1 |
| 4,733,253 | A | * | 3/1988 | Daniele | ............ 347/247 |
| 5,390,022 | A | | 2/1995 | Ishizuka et al. | |
| 6,526,190 | B2 | * | 2/2003 | Holzapfel et al. | ............ 385/12 |
| 7,019,842 | B2 | * | 3/2006 | Holzapfel et al. | ............ 356/499 |
| 2004/0261283 | A1 | * | 12/2004 | Falkinger et al. | ............ 33/707 |
| 2004/0263846 | A1 | | 12/2004 | Kwan | |

FOREIGN PATENT DOCUMENTS

EP  0 548 848 A1  6/1993

* cited by examiner

*Primary Examiner*—Georgia Y Epps
*Assistant Examiner*—Don Williams
(74) *Attorney, Agent, or Firm*—Brinks Hofer Gilson & Lione

(57) ABSTRACT

An optical scanning unit of a position measuring system for measuring a relative position of a first machine element with respect to a second machine element in a measuring direction. The optical scanning unit includes a support of a scanning grating attached to the first machine element and a detector unit attached separately to the first machine element, wherein a scanning light beam extends from the scanning grating to the detector unit as a free beam.

4 Claims, 3 Drawing Sheets

OPTICAL SCANNING UNIT AND METHOD FOR MOUNTING THE SAME

Applicants claim, under 35 U.S.C. § 119, the benefit of priority of the filing date of Nov. 9, 2005 of a German patent application, copy attached, Serial Number 10 2005 053 787.1, filed on the aforementioned date, the entire contents of which is incorporated herein by reference.

BACKGROUND OF THE INVENTION

1. Field of the Invention

The present invention relates to an optical scanning unit of a position measuring system for measuring the relative position of a first machine element with respect to a second machine element in at least one measuring direction. The present invention furthermore relates to a method for mounting a position measuring system, wherein the position measuring system is designed for measuring the relative position of a first machine element with respect to a second machine element in at least one measuring direction.

2. Discussion of Related Art

An optical scanning unit is known from EP 0 548 848 A1, for example. The scanning unit includes a support for a scanning grating and a detector unit with an arrangement of several photo-detectors. The support of the scanning grating and the detector unit are rigidly connected with each other. The position of the photo-detectors in relation to the scanning grating is predetermined and fixed by this connection. In this state the support of the scanning grating and the detector unit are installed as a common structural unit on a machine element to be measured.

In order to design the scanning unit for easy handling, the structural size, and therefore the stability, of this structural unit is greatly limited. As a rule, the detector unit is connected via cables to external electronic elements. These cable connections can exert impermissible forces on the detector unit, which are transmitted through the connection and therefore can lead to bending, and therefore distortion of the scanning grating.

In connection with highly accurate position measuring systems it can furthermore be necessary to assign a cooling device to the detector unit in order to prevent impermissible heat radiation from the detector unit to its surroundings, i.e. the scanning grating and the scale. Forces which can lead to bending or distortions of the scanning grating can also be introduced by this cooling device.

OBJECTS AND SUMMARY OF THE INVENTION

It is therefore an object of the present invention to design an optical scanning unit in such a way that the accuracy of measurement is affected as little as possible by exterior influences.

This object is attained by an optical scanning unit of a position measuring system for measuring a relative position of a first machine element with respect to a second machine element in a measuring direction. The optical scanning unit includes a support of a scanning grating attached to the first machine element and a detector unit attached separately to the first machine element, wherein a scanning light beam extends from the scanning grating to the detector unit as a free beam.

It is a further object of the present invention to disclose a method for mounting the optical scanning unit, by which a scanning unit is produced whose measuring accuracy remains unaffected by exterior influences as much as possible during measuring operations.

This object is attained by a method for mounting a position measuring system, wherein the position measuring system is designed for measuring a relative position of a first machine element with respect to a second machine element in a measuring direction X. The method includes making a support of a scanning grating available, wherein the support includes a first connector for attachment of the support to the first machine element. The method further includes making a detector unit available, wherein the detector unit includes a second connector for attachment of the detector to the first machine element separate from the support of the scanning grating. The method further includes attachment of the support of the scanning grating to the first machine element via the first connector and attachment of the detector unit via the second connector to the first machine element.

Exemplary embodiments of the present invention will be explained in greater detail by the drawings. Advantages of the present invention are noted in the description which follows.

DETAILED DESCRIPTION OF THE PREFERRED EMBODEMENTS

Figure 1:
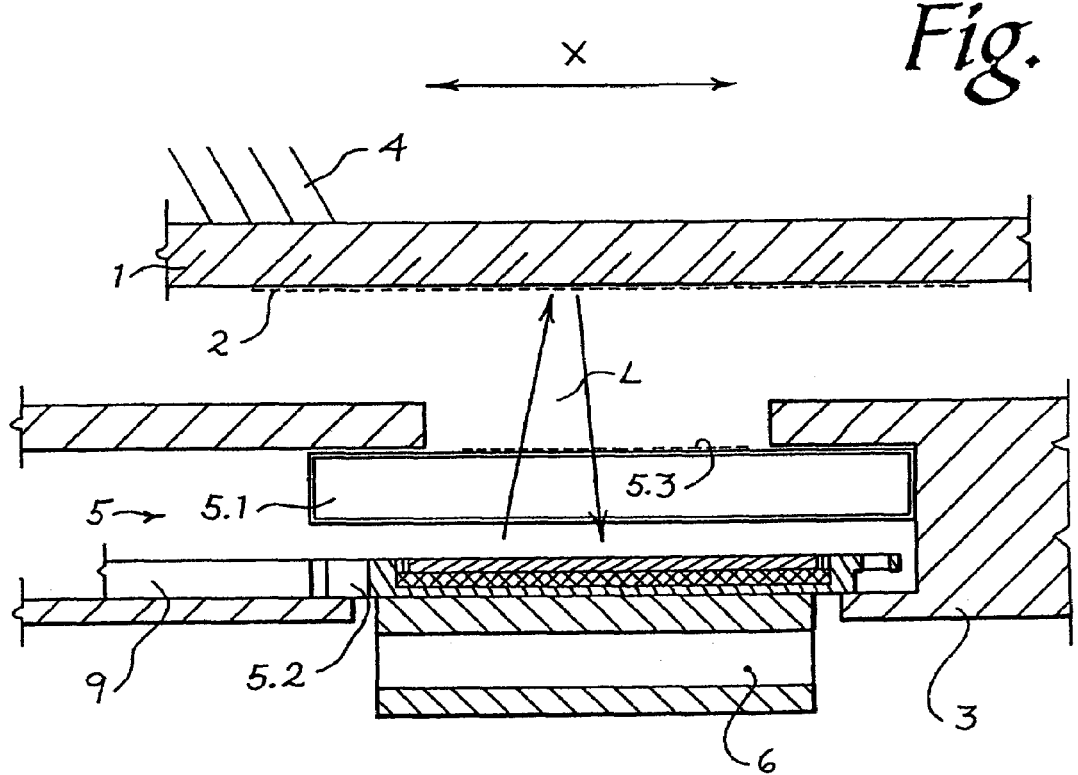
FIG. 1 shows a first embodiment of an optical scanning unit installed on a first machine element in accordance with the present invention.

A first exemplary embodiment of a position measuring system is represented in FIG. 1. This position measuring system includes a scale 1 with a measuring graduation 2, which can be optically scanned. This measuring graduation 2 is an incremental graduation or an absolute coding. For position measuring, the measuring graduation 2 is scanned in the measuring direction X by an optical scanning unit 5 for measuring the relative position of two machine elements 3 and 4. For position measuring in several dimensions X, Y, the measuring graduation can also be a cross grating, known per se.

In the example represented, the scanning unit 5 is fastened on the first machine element 3, and the scale 1 on the second machine element 4, which can be moved relative to the first machine element. For solid fastening of the scanning unit 5 it includes a support 5.1 of a scanning grating 5.3 and a detector unit 5.2 can be used, which can be installed separately from it. Both elements 5.1 and 5.2 can each be installed separately on the first machine element 3. This means that the support 5.1 and the detector unit 5.2 constitute a parallel arrangement in contrast to the serial arrangement in accordance with the prior art.

Figure 4:
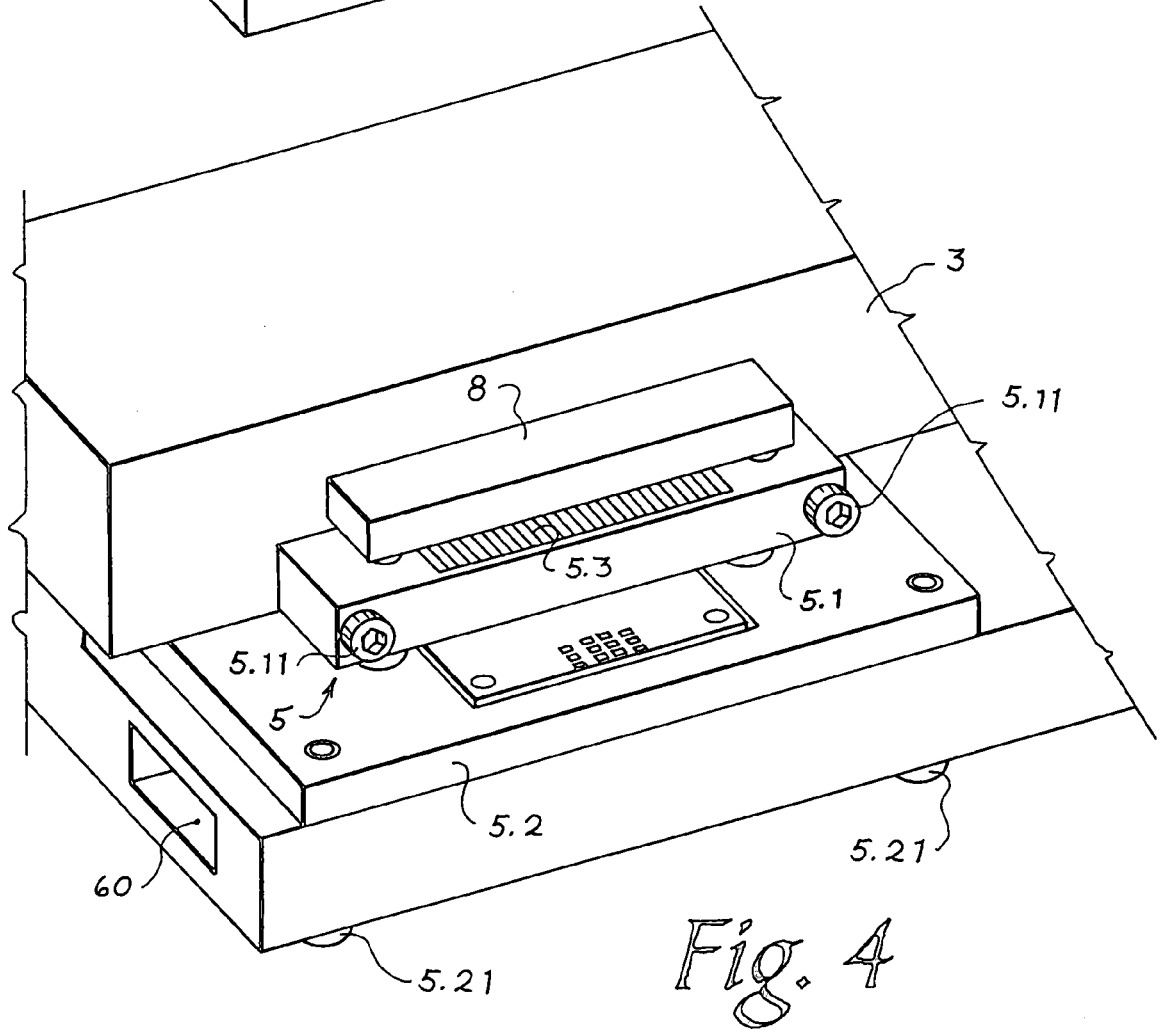
FIG. 4 represents the pre-assembled optical scanning unit of FIG. 3 in the course of its installation.

For this purpose, the support 5.1 of the scanning grating 5.3 has a connector 5.11 for attachment to the first machine element 3, and the detector unit 5.2 has a connector 5.21 for attachment to the first machine element 3. These connectors can be appropriately designed attachment face(s) and/or bore(s), as well as attachment elements, such as screw(s) or an adhesive. In FIG. 4, the first connector(s) are screws 5.11, and the second connector(s) are also screw(s) 5.12. However, attachment can also be provided, for example, by gluing or bonding (for example direct bonding, low temperature bonding (LTD), anodic bonding).

Here, the scanning grating 5.3 can be directly scribed onto the support 5.1, can be a laminated package applied to the support 5.1, or can be a substrate applied to the support 5.1.

The detector unit 5.2 includes an arrangement of light-sensitive photo-detectors on a printed circuit board, as well as further heat-producing electrical components, such as amplifiers for pre-processing the electrical scanning signals, for example. Therefore the detector unit 5.2 acts as an interfering heat source, which can lead to expansion of the material of the detector unit 5.2, as well as elements located nearby and therefore lead to distortions of the scanning grating 5.3. For example, scanning grating 5.3 can be affected by the heat radiation emanating from the detector unit 5.2 to a greater degree than via the more stable machine element 3. Moreover, the scale 1 can also be disadvantageously affected. To minimize such disadvantageous influences, a cooling device 6 is assigned to the detector unit 5.2. In accordance with FIG. 1, the cooling device 6 is connected as a separate component with the detector unit 5.2. The job of the cooling device 6 is to deflect the heat generated by the detector unit 5.2 away from the support 5.1. of the scanning grating 5.3, as well as from the scale 1. To this end, in a known manner the cooling device 6 can have cooling ribs or can be a cooling element through which a medium flows. Here, air or a liquid, in particular water, can be used for temperature-stabilizing cooling.

Since such a cooling device 6 must be in contact with the detector unit 5.2 for satisfactory heat removal and be made of a material which conducts heat well, i.e., as a rule have an expansion behavior differing from the detector unit 5.2, forces can act on the detector unit 5.2 via the cooling device 6. Such forces can also be caused by the feed lines for the cooling medium in the form of reaction forces based on acceleration in the course of the position measuring process. Furthermore, dynamic excitation can be exerted on the detector unit 5.2 because of the flow of the cooling medium through the cooling device 6. Because of the fastening of the detector unit 6 on the first machine element 3 separate from the support 5.1 of the scanning grating 5.3, such forces are not transferred directly to the scanning grating 5.3, but are absorbed by the relatively solidly constructed first machine element 3, which increases the positional stability of the scanning grating 5.3 in relation to the scale 1, and therefore the accuracy of measurement.

Shifting of the detector unit 5.2 because of the effects of temperature and exterior forces has lesser effects than the shifting of the support 5.1. During the entire measuring process the detector unit 5.2 remains stably positioned in such a way that the scanning light beam L impinges on the surfaces of the photo-detectors.

In addition to the scanning grating 5.3, the support 5.1 can also have further optical components affecting the scanning light beam L, for example deflecting mirrors, further optical gratings in the form of coupling and uncoupling gratings, or splitting gratings, lenses, Fresnel plates, polarizers.

The light of the scanning light beam L can be supplied to the scanning unit 5 via an optical waveguide 9 arranged on the detector unit 5.2. For generating the scanning light beam bundle L, either the detector unit 5.2 or the support 5.1 can have a light source. In addition, the detector unit 5.2 can also contain optical components, for example for light beam guidance.

In what follows, components with the same functions will be identified by the same reference numerals as in FIG. 1.

Figure 2:
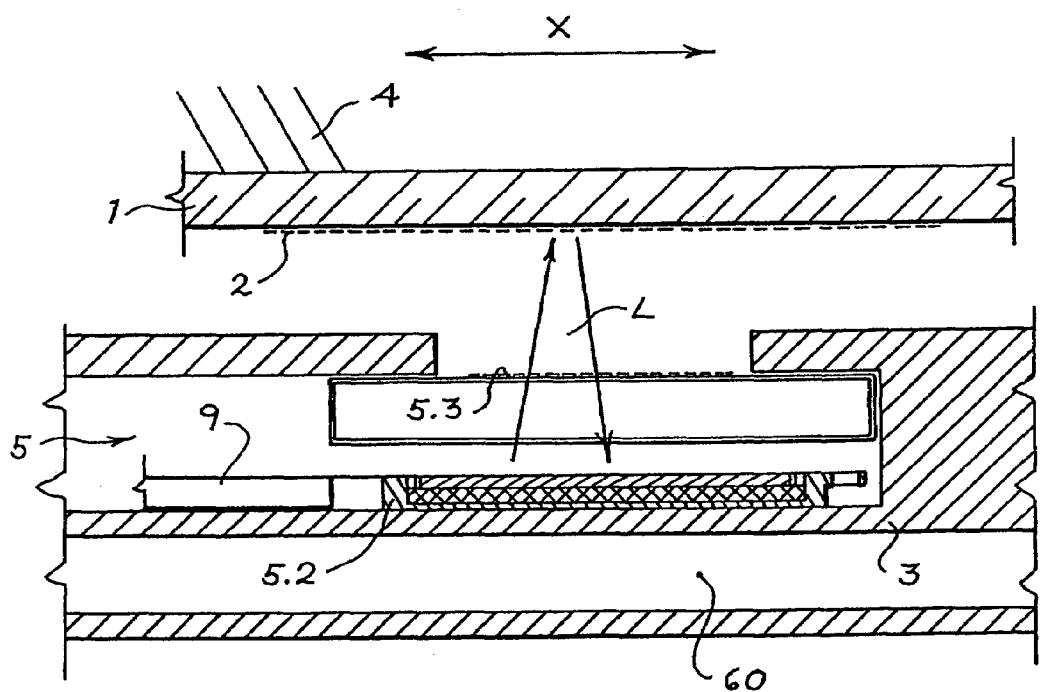
FIG. 2 shows a further embodiment of an optical scanning unit installed on a first machine element in accordance with the present invention.

The second exemplary embodiment in accordance with FIG. 2 corresponds to a large extent to the first exemplary embodiment. The difference lies in the form of the cooling device 60. The cooling device 60 is a component of the first machine element 3, or is a component attached to the latter. It includes a conduit for the flow of a cooling medium embedded into the first machine element 3.

The scanning light beam L extends in the optical scanning unit 5 from the scanning grating 5.3 to the detector unit 5.2 as a free beam. This means that the scanning light beam L extends between them in a free environment without a guiding wall, such as optical wave guides. The distance between the scanning grating 5.3 and the detector unit 5.2 lies in the range of a few millimeters, in particular up to approximately 20 mm.

The following method processes are particularly advantageous during assembly: of the optical scanning units of FIGS. 1 and 2:

making the support 5.1 of the scanning grating 5.3 available, wherein the support 5.1 has a first connector 5.11 for attachment to the first machine element 3;

making the detector unit 5.2 available, wherein the detector unit 5.2 has a second connector 5.21 for attachment to the first machine element 3 separate from the support 5.1 of the scanning grating 5.3;

attachment of the support 5.1 of the scanning grating 5.3 to the first machine element 3 with the help of the first connector 5.11; and attachment of the detector unit 5.2 with the help of the second connector 5.21 to the first machine element 3.

For making the attachment of the scanning unit 5 to the first machine element 3 easier for the user of the position measuring system, it is advantageous if the support 5.1 of the scanning grating 5.3 is positioned in relation to the detector unit 5.2 by a positioning element 8, and the support 5.1 of the scanning grating 5.3 is attached to the first machine element 3 with the help of the first connector 5.11, and the detector unit 5.1 is attached in this positioned association to the first machine element 3 with the help of the second connector 5.21.

Figure 3:
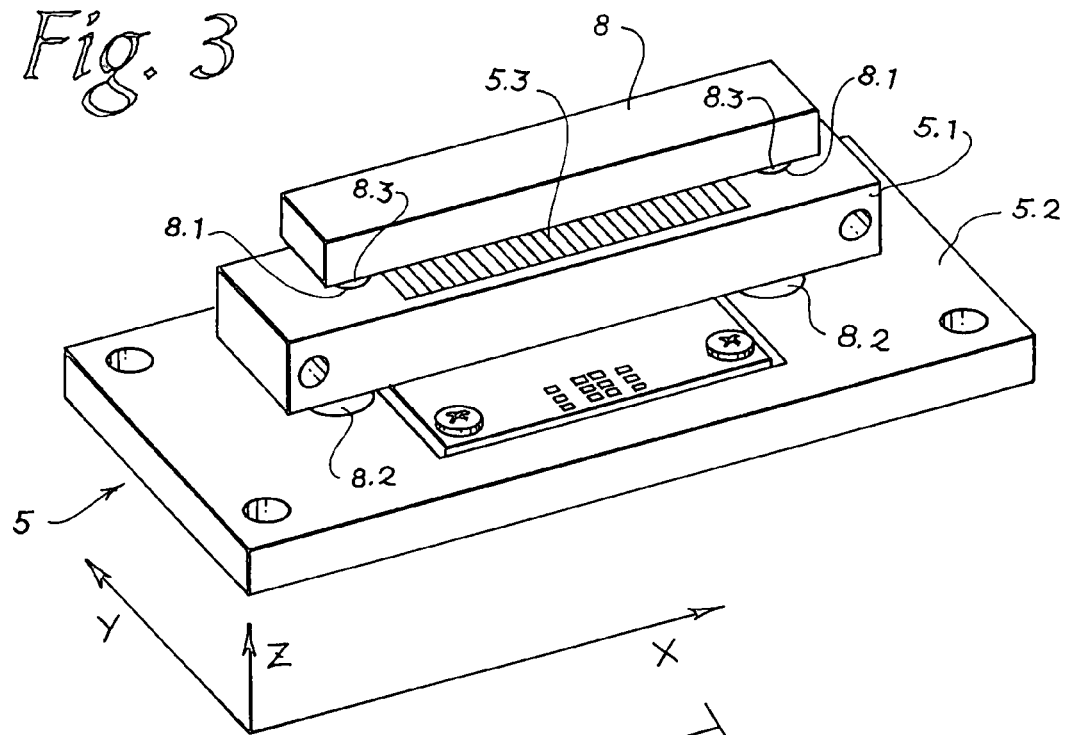
FIG. 3 represents a pre-assembled optical scanning unit of FIGS. 1-2 prior to its installation.

In the embodiment represented, the positioning element is a mechanical attachment aid 8, by which the support 5.1 of the scanning grating 5.3 is pre-adjusted in relation to the detector unit 5.2. In this adjusted position the support 5.1 is connected with the detector unit 5.2 with the help of the attachment aid 8, which fixes the coordination between the scanning grating 5.3 and the detector unit 5.2 during attachment at least in the measuring direction X. FIG. 3 shows this pre-assembled scanning unit 5. In this case the attachment aid 8 is embodied in such a way that it fixes the support 5.1, and therefore the scanning grating 5.3, relative to the detector unit 5.2 in the X-Y plane. This fixation is designed in such a way that the scanning light beam L impinges on the photo-detectors of the detector unit 5.2. In the example represented, the support 5.1 is positively connected with the detector unit 5.2 by the attachment aid 8. This positive connection is provided by bores 8.1 in the support 5.1 and bores 8.2 in the detector unit 5.2, which are engaged by pins 8.3 of the attachment aid 8. The position in the Z direction is not predetermined by the attachment aid 8, it is defined by the position of the attachment faces predetermined by the first machine element 3.

The scanning unit 5 is attached to the first machine element 3 in the pre-assembled position represented in FIG. 3 in that the support 5.1 is screwed to the first machine element 3, and, in addition and separately, the detector unit 5.2 is also screwed to the first machine element 3. This attachment step is represented in FIG. 4.

Figure 5:
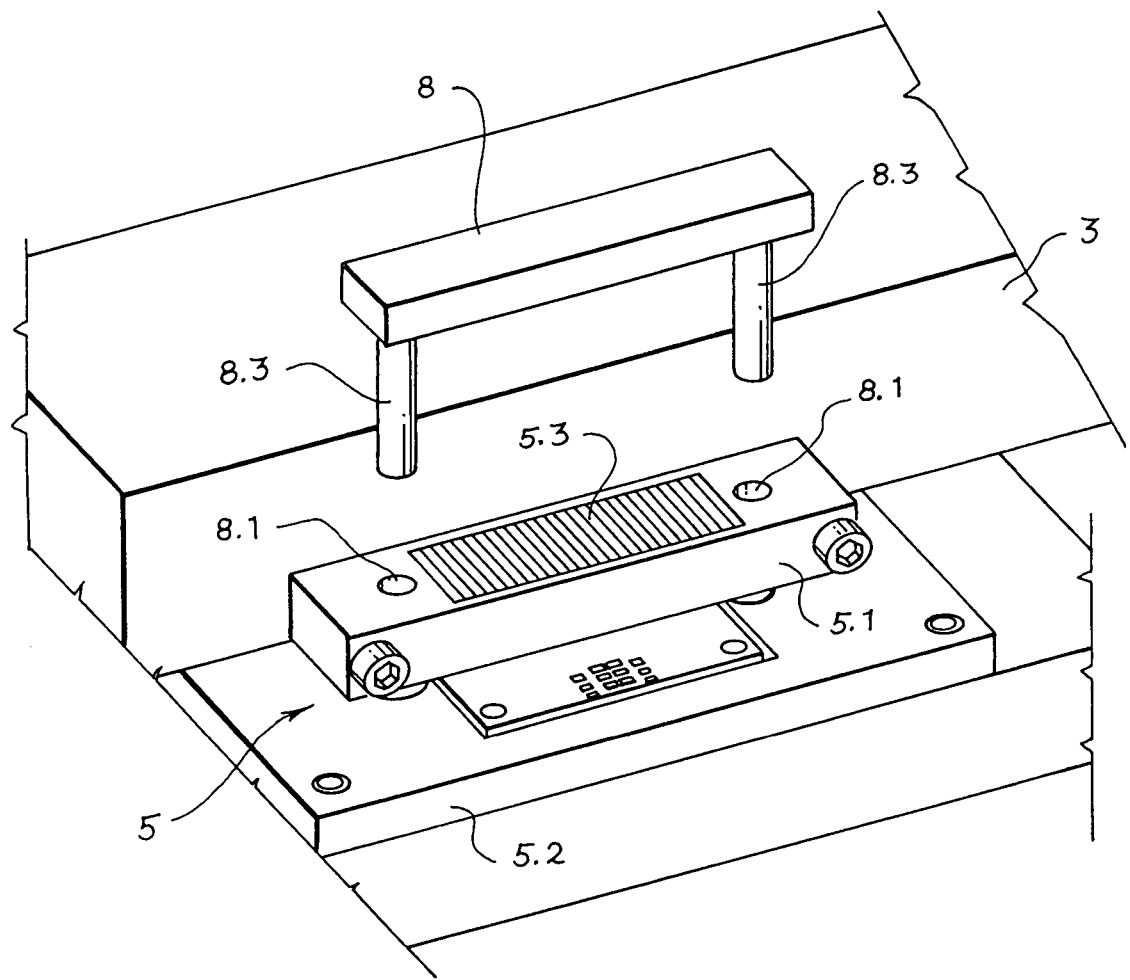
FIG. 5 represents the optical scanning unit of FIG. 3 after having been installed.

Following the completed attachment of the support 5.1 and the detector unit 5.2 to the first machine element 3, the connection made by the attachment aid 8 can be released. This release of the connection takes place by terminating the positive connection in that the attachment aid 8 is removed, as represented in FIG. 5.

The positioning element need not absolutely generate a mechanical positive connection, alternatives are also possible, such as positioning by optical alignment elements in the form of markers, for example.

The two machine elements 3 and 4 whose position is to be measured can be components of a lithographic device in accordance with US 2004/0263846 A1. The first and second machine elements are preferably made of a material with a negligible coefficient of expansion, for example glass-ceramic material in the form of the material known by the trademark ZERODUR.

The foregoing description is provided to illustrate the present invention, and is not to be construed as a limitation. Numerous additions, substitutions and other changes can be made to the present invention without departing from its scope as set forth in the appended claims.

We claim:

1. An optical scanning unit of a position measuring system for measuring a relative position of a first machine element with respect to a second machine element in a measuring direction, the optical scanning unit comprising:

a support of a scanning grating attached to said first machine element;

a detector unit attached separately to said first machine element, wherein a scanning light beam extends from said scanning grating to said detector unit as a free beam; and a positioning element which fixes coordination of said support of said scanning grating relative to said detector unit during attachment at least in said measuring direction, wherein said positioning element is an attachment aid by which said support of said scanning grating forms a connection with said detector unit during attachment, and said connection can be released after completion of attachment of said support of said scanning grating to said first machine element and of said detector unit to said first machine element.

2. The optical scanning unit in accordance with claim 1, further comprising a cooling device assigned to said detector unit.

3. The optical scanning unit in accordance with claim 2, wherein said cooling device is a cooling element, which is in contact with said detector unit and through which a medium flows.

4. The optical scanning unit in accordance with claim 1, further comprising an optical waveguide arranged on said detector unit, wherein said light of said scanning light beam is supplied to said scanning unit via said optical waveguide.

* * * * *